(12) United States Patent
Pavageau et al.

(10) Patent No.: US 11,974,395 B2
(45) Date of Patent: Apr. 30, 2024

(54) SECURITY ELEMENT, ELECTRONIC CARD, ELECTRONIC PAYMENT TERMINAL, CORRESPONDING MANUFACTURING METHOD AND ASSEMBLY METHOD

(71) Applicant: BANKS AND ACQUIRERS INTERNATIONAL HOLDING, Paris (FR)

(72) Inventors: Stéphane Pavageau, La Roche de Glun (FR); Eric Bonnet, Malissard (FR)

(73) Assignee: BANKS AND ACQUIRERS INTERNATIONAL HOLDING, Paris (FR)

(*) Notice: Subject to any disclaimer, the term of this patent is extended or adjusted under 35 U.S.C. 154(b) by 276 days.

(21) Appl. No.: 17/541,701

(22) Filed: Dec. 3, 2021

(65) Prior Publication Data

US 2022/0183152 A1 Jun. 9, 2022

(30) Foreign Application Priority Data

Dec. 4, 2020 (FR) ...................................... 2012695

(51) Int. Cl.
*G06Q 20/20* (2012.01)
*H05K 1/02* (2006.01)

(52) U.S. Cl.
CPC .......... *H05K 1/0296* (2013.01); *G06Q 20/20* (2013.01)

(58) Field of Classification Search
CPC ...... G06F 21/86; G06Q 20/20; H05K 1/0275; H05K 1/0296; H05K 1/02; H05K 2201/10053; H05K 3/341; Y02P 70/50
(Continued)

(56) References Cited

U.S. PATENT DOCUMENTS

| 8,358,218 B2 | 1/2013 | Neo et al. |
| 2005/0205393 A1* | 9/2005 | Bricaud ............... H01H 25/002 200/5 R |
| 2008/0128255 A1* | 6/2008 | Villain .................. H05K 3/303 200/520 |

FOREIGN PATENT DOCUMENTS

| EP | 1928008 A1 | 6/2008 |
| EP | 2821894 A1 | 1/2015 |

(Continued)

OTHER PUBLICATIONS

French Search Report and Written Opinion dated Sep. 26, 2021 for corresponding French Application No. 2012695, filed Dec. 4, 2020.

*Primary Examiner* — Timothy J Thompson
*Assistant Examiner* — Guillermo J Egoavil
(74) *Attorney, Agent, or Firm* — David D. Brush; Westman, Champlin & Koehler, P.A.

(57) ABSTRACT

A security element intended to be electrically connected to an electronic card. The security element includes: a metal portion, called a dome; a conductive assembly including conductive tracks which are not connected to each other including an outer track and a central track, each having a conductive tab intended to connect them to the electronic card; and a non-conductive support having lumens via which the conductive tabs extend from the conductive tracks to the electronic card. The ends of the conductive tabs are intended to be in contact with the electronic card and do not extend beyond the non-conductive assembly such that the connections between the tracks and the electronic card are located under a lower face of the non-conductive assembly.

15 Claims, 11 Drawing Sheets

(58) Field of Classification Search
USPC .......................................................... 174/261
See application file for complete search history.

(56) References Cited

FOREIGN PATENT DOCUMENTS

| | | |
|---|---|---|
| WO | 2004021381 A2 | 3/2004 |
| WO | 2004021381 A3 | 4/2004 |
| WO | 2005024872 A1 | 3/2005 |

* cited by examiner

[Fig. 1a]
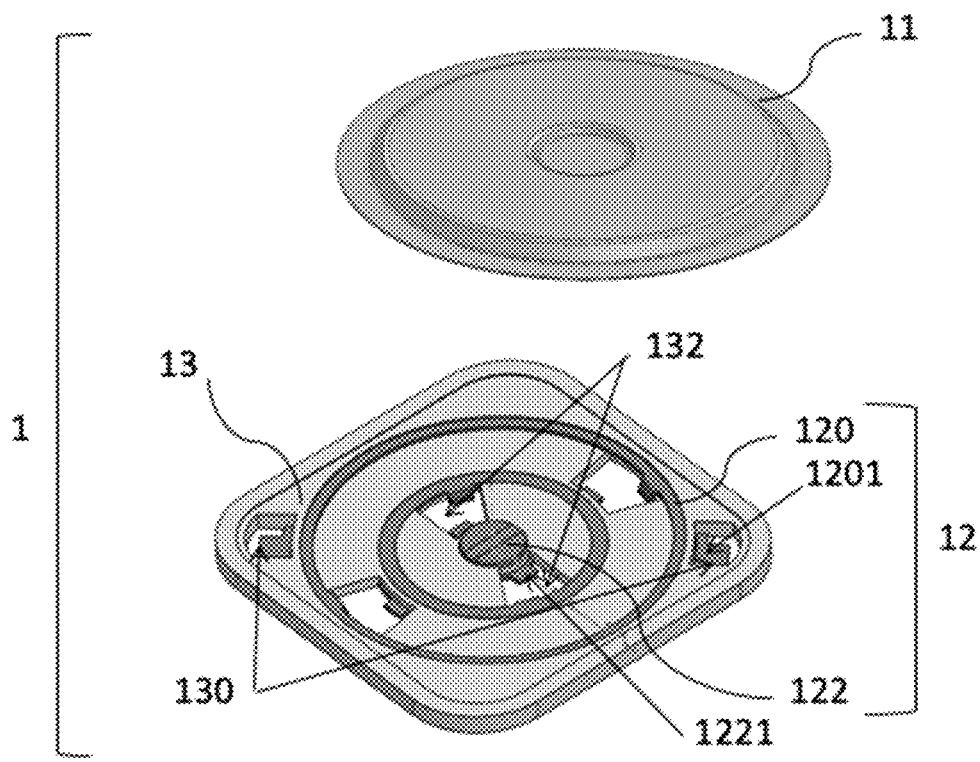
[Fig. 1b]
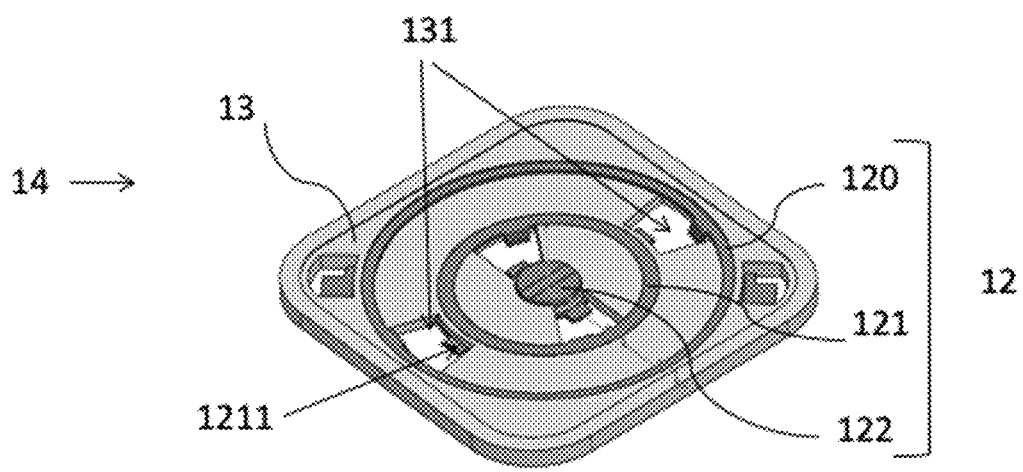

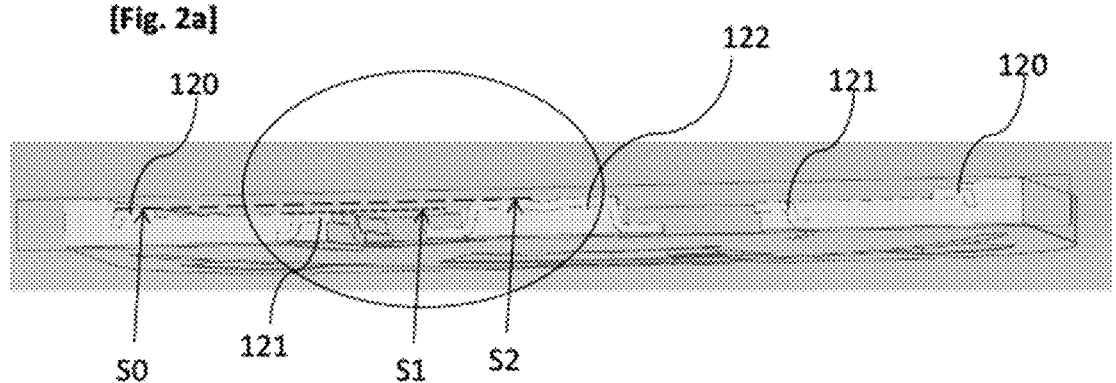
[Fig. 2a]
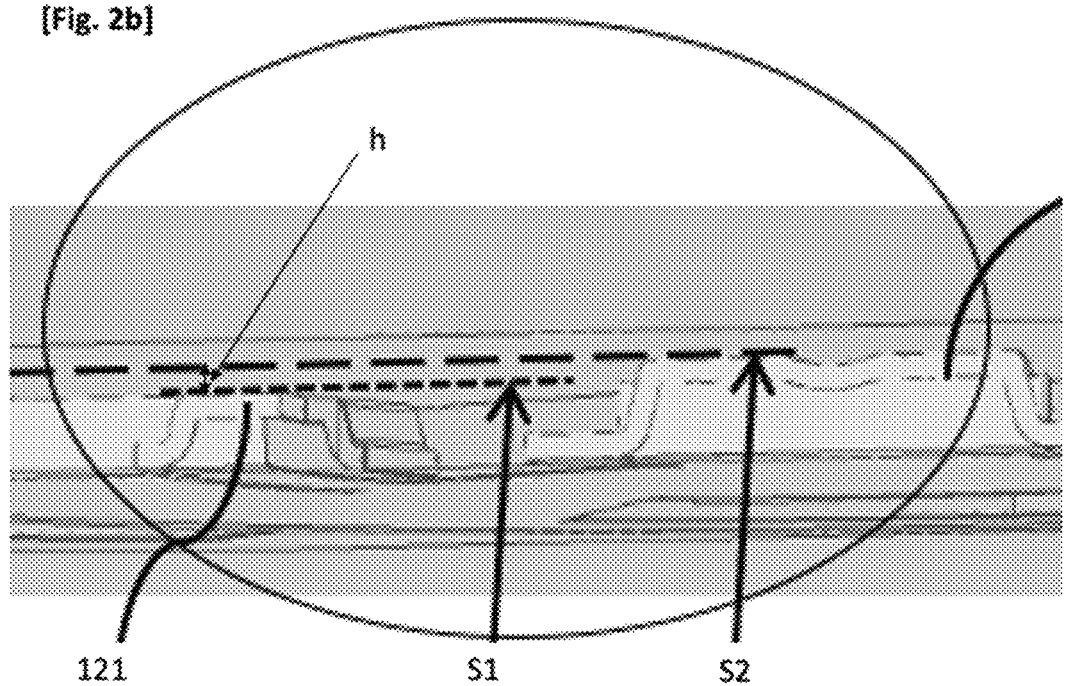
[Fig. 2b]

[Fig. 3a]
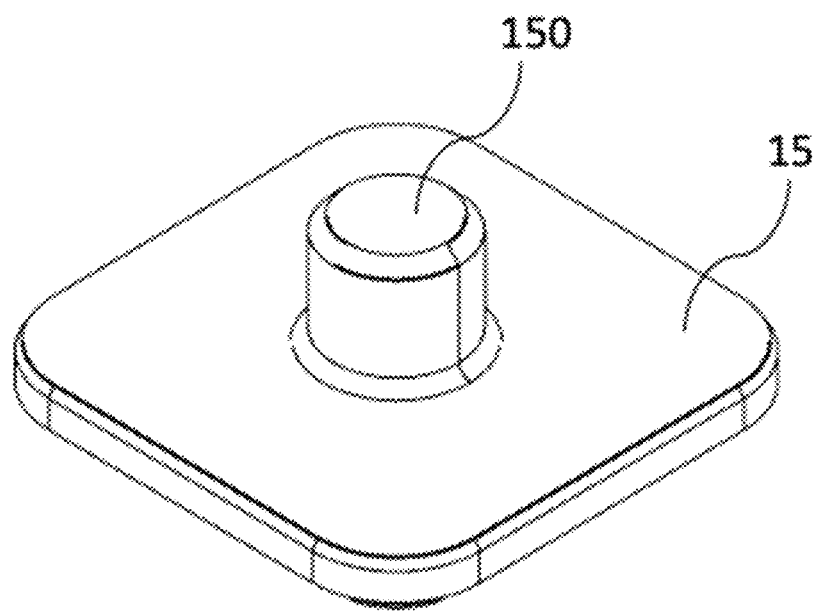
[Fig. 3b]
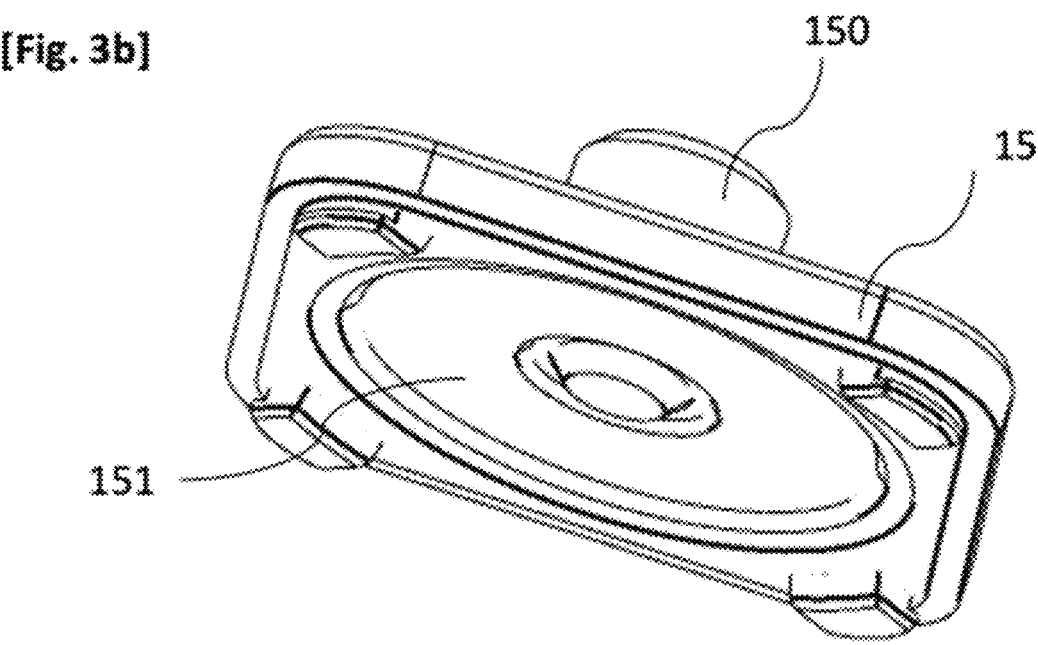

[Fig. 4]
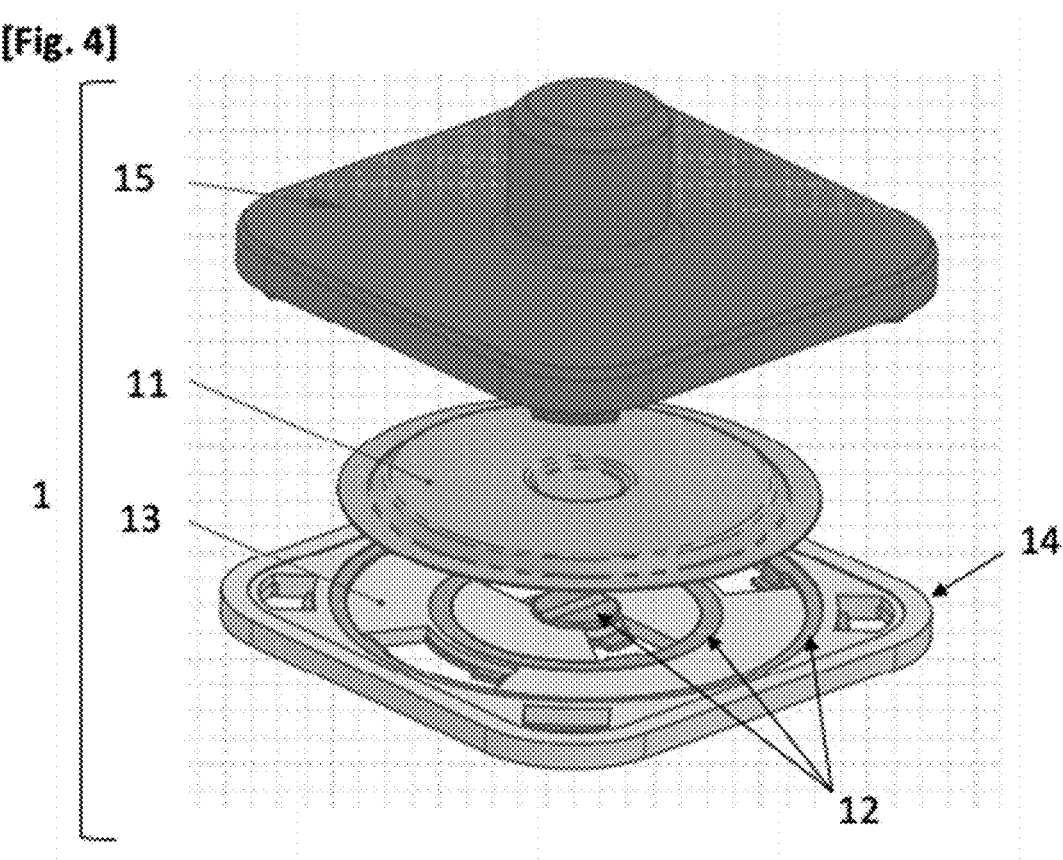
[Fig. 5]
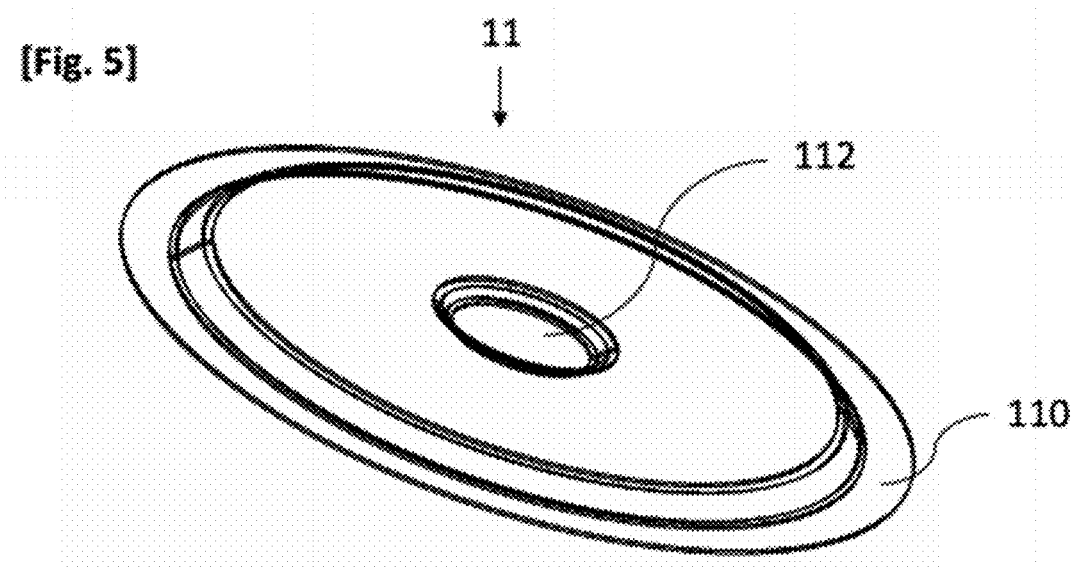

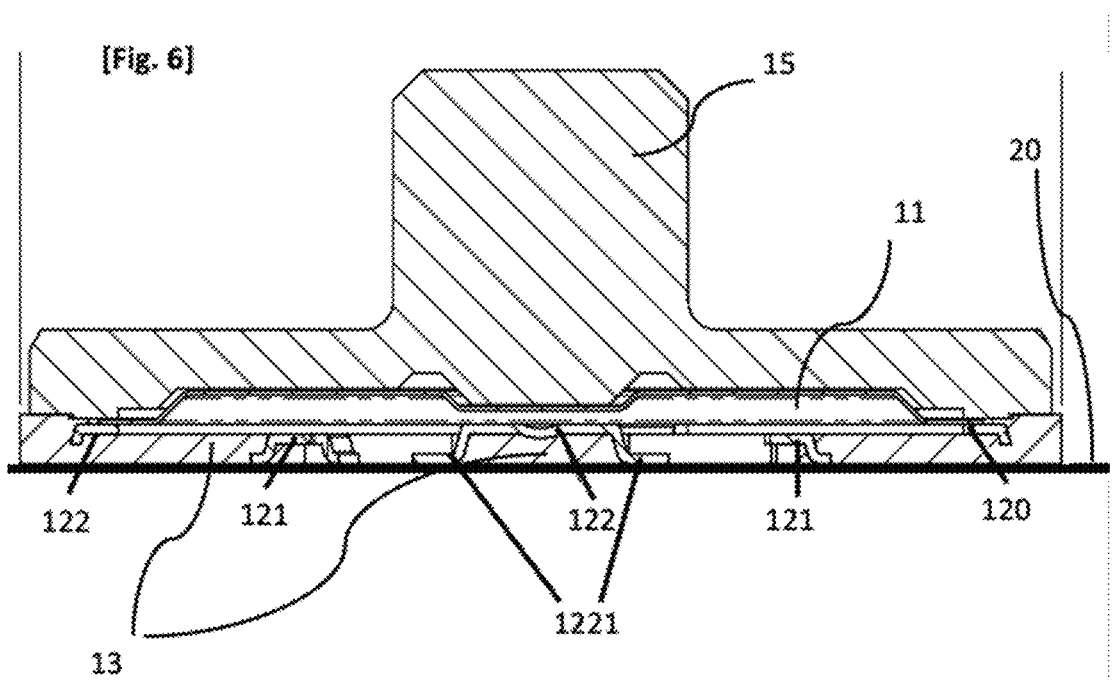
[Fig. 6]
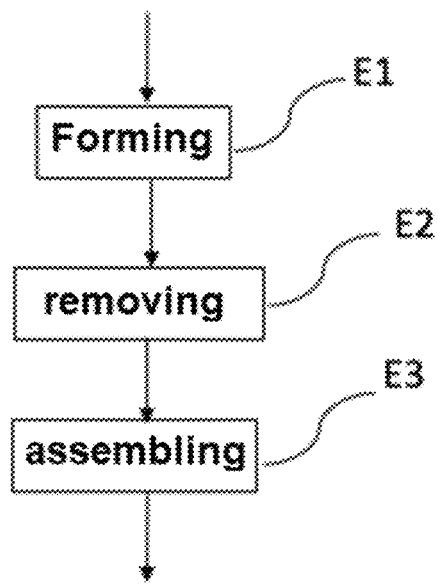
[Fig. 7a]

[Fig. 7b]
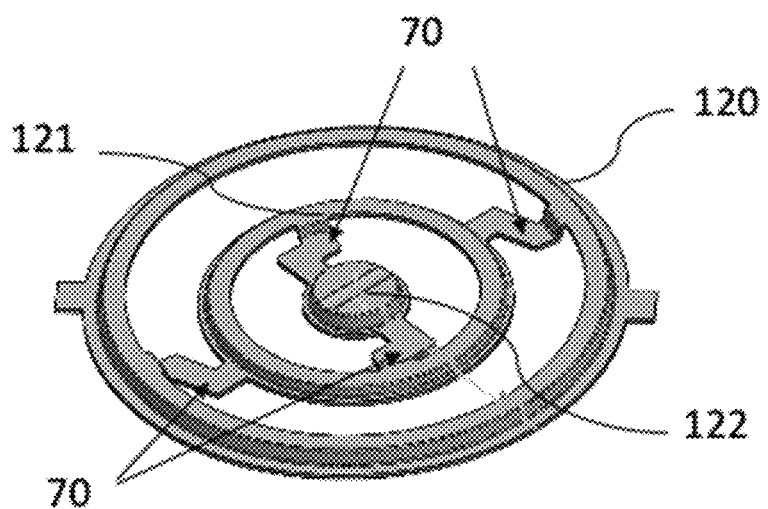
[Fig. 7c]
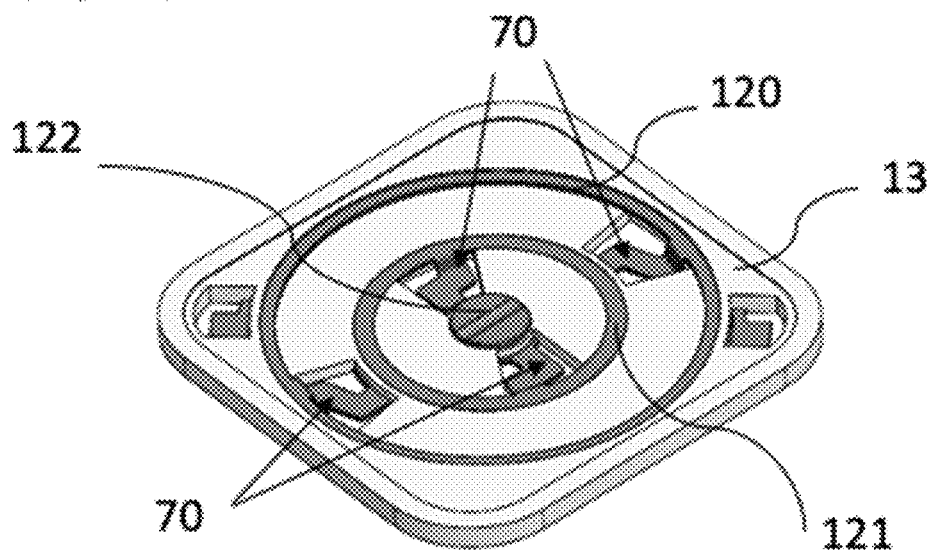

[Fig. 7d]
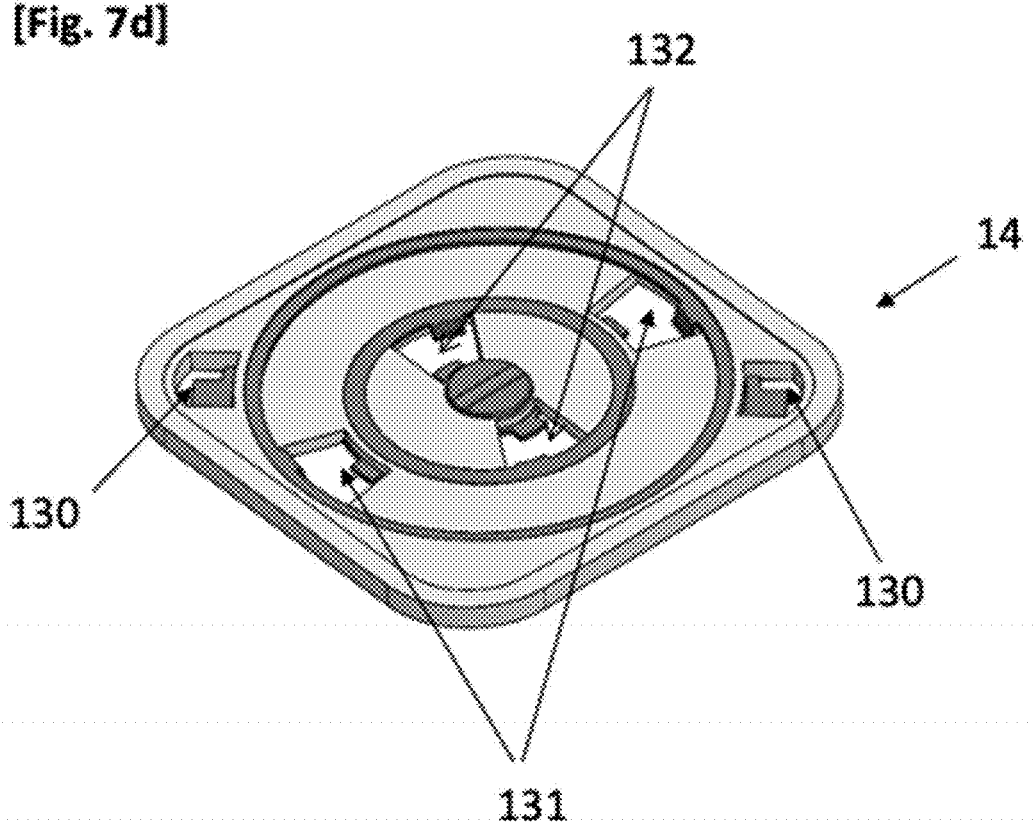
[Fig. 7e]
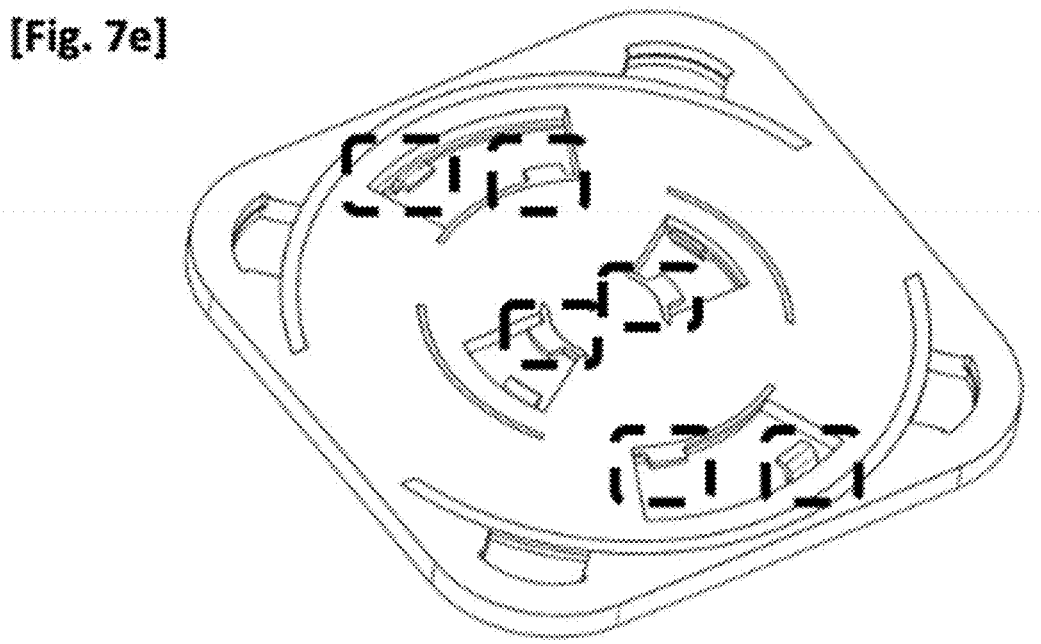

[Fig. 8a]
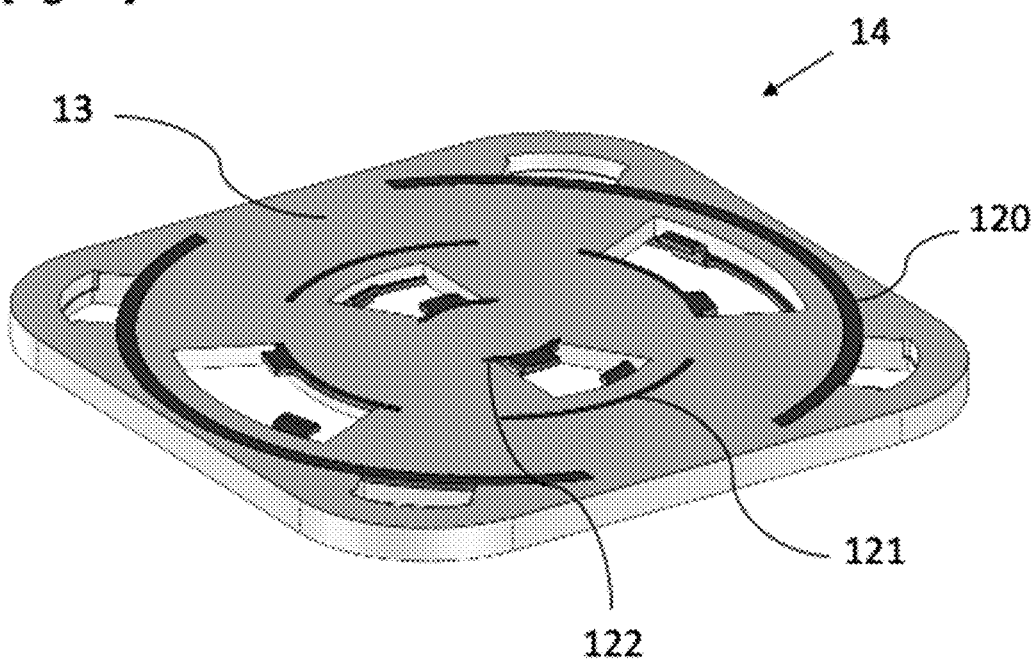
[Fig. 8b]
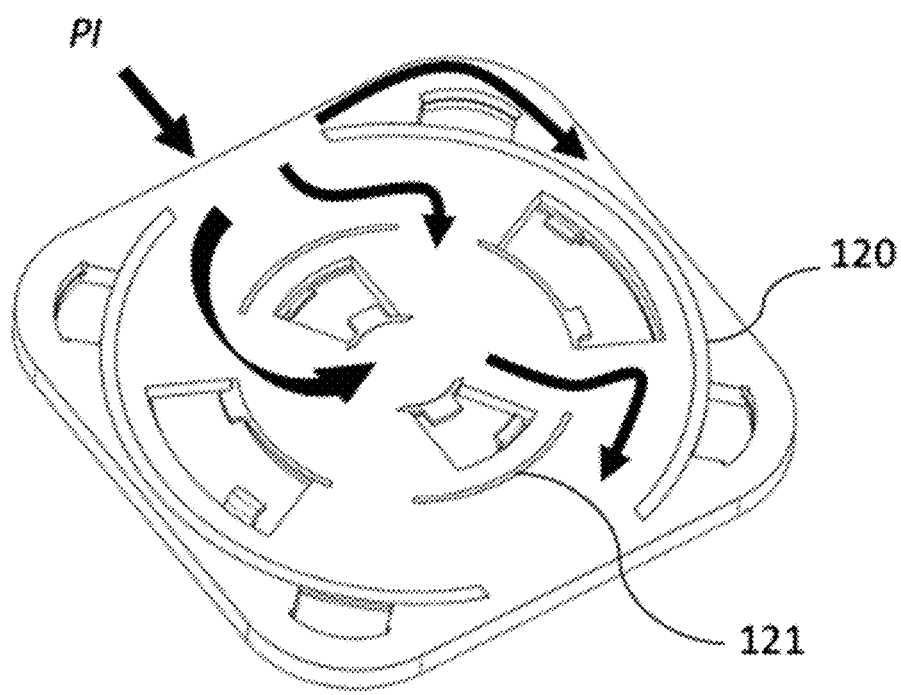

[Fig. 9a]
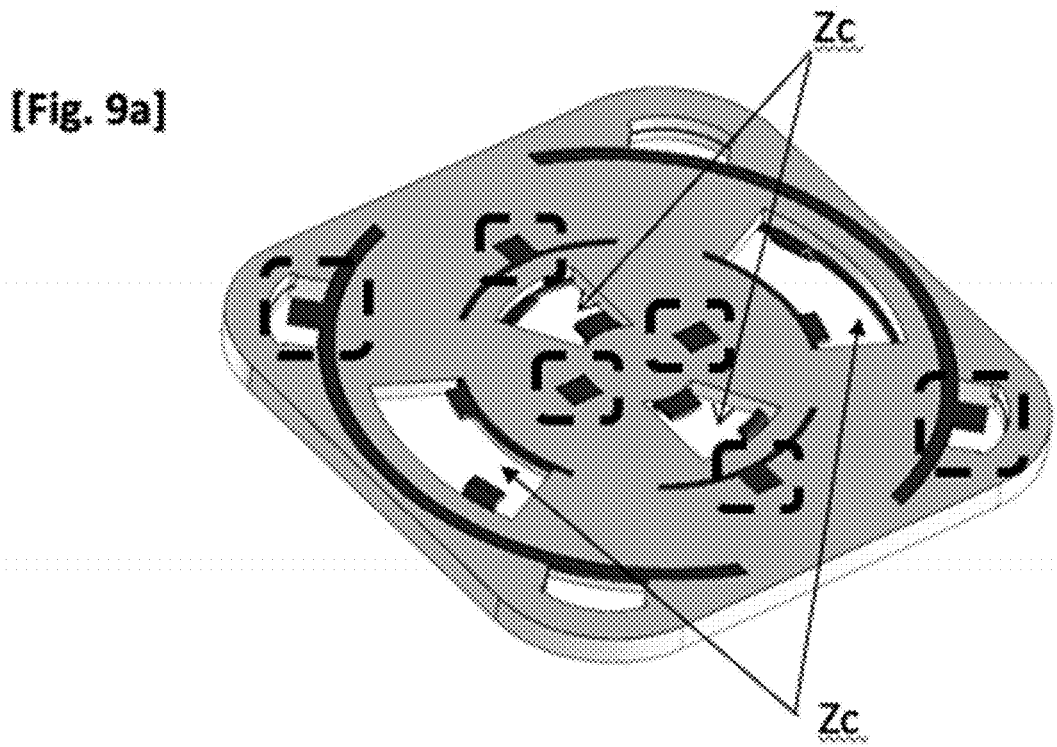
[Fig. 9b]
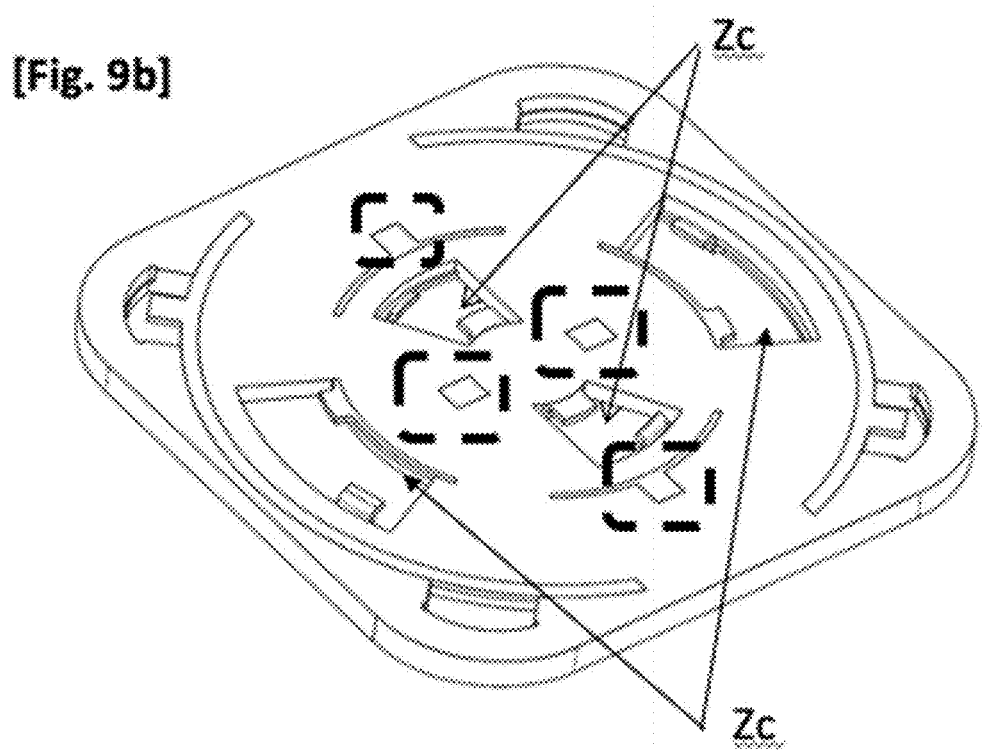

[Fig. 9c]
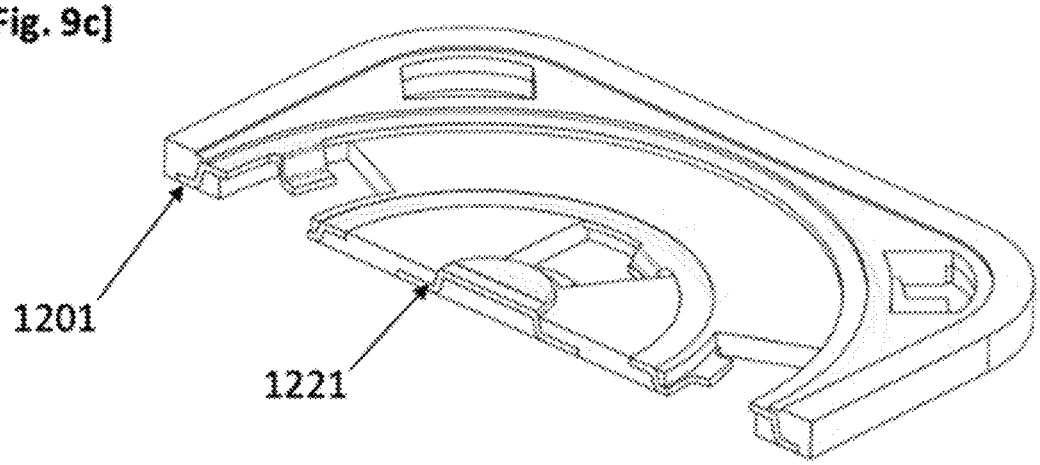
[Fig. 10a]
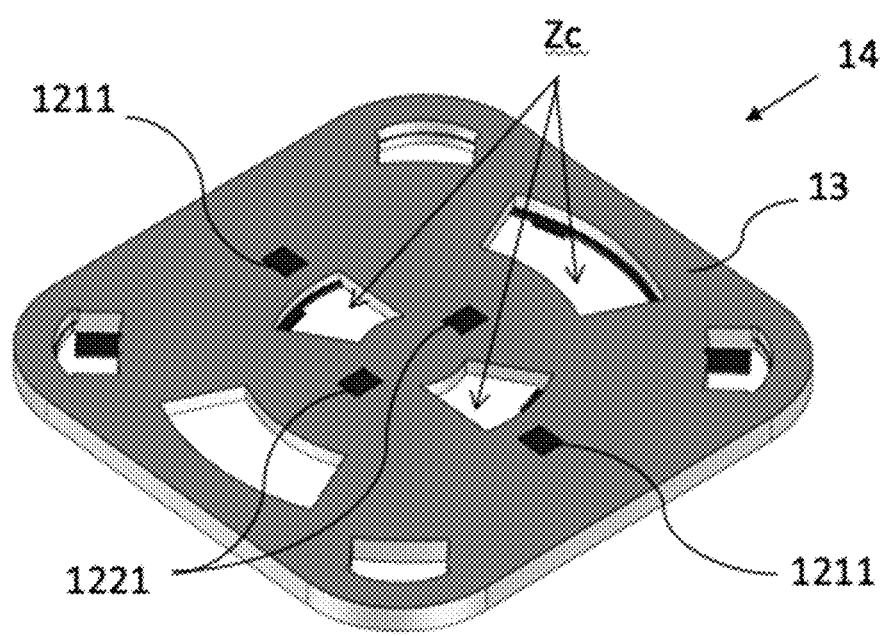

[Fig. 10b]
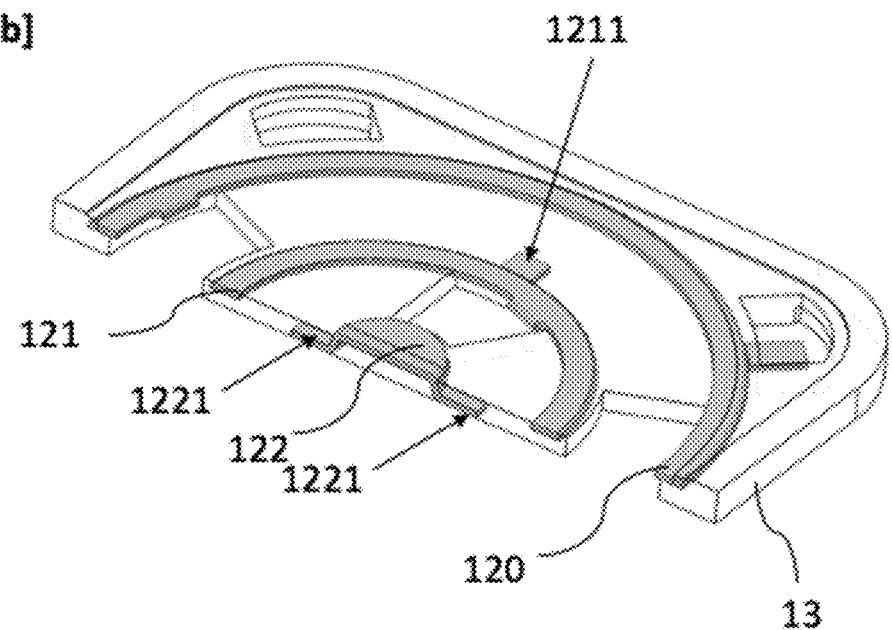
[Fig. 11]
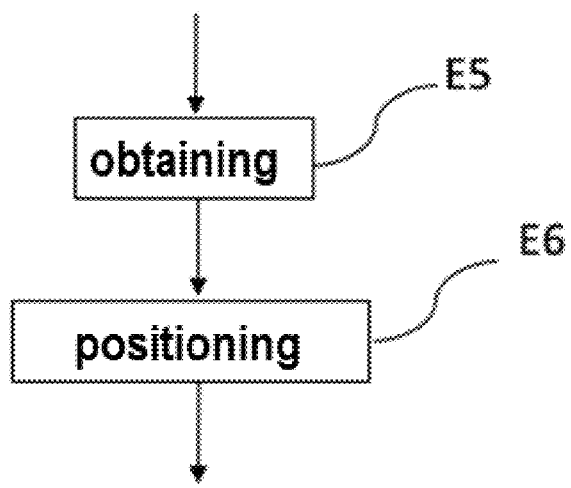

SECURITY ELEMENT, ELECTRONIC CARD, ELECTRONIC PAYMENT TERMINAL, CORRESPONDING MANUFACTURING METHOD AND ASSEMBLY METHOD

FIELD OF THE INVENTION

The field of the invention is that of the electronic devices comprising at least one electronic card on which electronic components are implanted.

More specifically, the invention relates to securing and improving the performance of such an electronic card.

The use of such electronic cards is widespread in industry. Moreover, many fields require high levels of security in terms of confidentiality of the electrical signals transiting through the equipment. The invention thus has numerous applications, in particular, but not exclusively, in the fields of electronic payment terminals, payment card readers, in the television decoders, etc., and more particularly for the detection of intrusion attempt in such electronic devices.

PRIOR ART AND ITS DRAWBACKS

It is therefore more particularly intended, in the remainder of this document, to describe an existing problem in the field of electronic payment terminals which the inventors of the present patent application have faced, relating to the particular components which are the security elements or domes conventionally used in the electronic payment terminals.

These specific components are in particular implemented with the aim of detecting an intrusion within an electronic payment terminal, within the broader framework of a system for securing such a device. Thus, a security dome is positioned at a strategic location of an electronic card in an electronic payment terminal, so as to close an electrical circuit when the casing of the electronic payment terminal is closed, due to a strain which applies to the security dome. Thus, when the electronic payment terminal undergoes an attempt to open, or to intrude, the security dome is "freed" from this strain and opens the electrical circuit, which is connected to an intrusion detection module triggering then actions for securing the electronic payment terminal (such as, for example, the erasure of all sensitive data, the error of the electronic payment terminal, etc.).

To date, there are two main techniques for installing/implanting these security domes on an electronic card: gluing and brazing (or soldering).

According to the first technique, the safety domes are glued on an electronic card, manually, by an operator, after the installation and soldering of the other components of the electronic card. Such security domes are conventionally composed of several elements, including a metal portion to ensure the electrical connection and one or more adhesive portions allowing the installation by gluing of the dome and the protection of the metal portion. This technique of installation by manual gluing generates difficulties of accuracy in the positioning of the security domes on the electronic card and can then generate problems during the operation of the electronic payment terminal, for example by the detection of false intrusion if one or more domes are incorrectly positioned in their security area. Indeed, the positioning of a security dome not only requires a very high accuracy, but can also be made difficult according to the location on the electronic card. Indeed, the components already positioned (by brazing) on the electronic card can either obscure the location of the dome or hinder its positioning. Finally, this manual technique has drawbacks in terms of installation efficiency, this efficiency being directly linked to the operator's ability to carry out this operation. This technique of installation by gluing can therefore generate low productivities and thus increase the manufacturing costs of electronic cards on which security domes are implanted.

According to the second technique, the security domes are soldered on an electronic card, automatically.

The main drawback of this technique lies in the reliability problems in use, due to the fact that the brazing/soldering is continuously biased by the mechanical stress, or strain, undergone by the security dome. Moreover, since the brazed joint is not reproducible in its shape, it is difficult to define rules for the reliability of installation and use according to this technique.

There is therefore a need for a technique for installing safety domes on an electronic card which allows an optimal reliability of installation and optimal reliability in use.

DISCLOSURE OF THE INVENTION

The invention meets this need by proposing a security element intended to be electrically connected to an electronic card, the said security element comprising at least:
  one metal portion, called dome;
  one conductive assembly comprising a plurality of conductive tracks which are not connected to each other and comprising at least one track called outer track and one track called central track, said outer and central tracks each having at least one conductive tab intended to connect respectively said outer and central tracks to said electronic card;
  one non-conductive support for said plurality of conductive tracks of said conductive assembly having lumens via which said conductive tabs extend from said outer and central tracks to said electronic card;
  the end of each of said conductive tabs intended to be in contact with said electronic card not extending beyond said non-conductive assembly such that the connections between said outer and central tracks and said electronic card are located under the lower face of said non-conductive assembly.

Thus, the present technique proposes a new and inventive solution to offer reliable, robust, inexpensive security elements according to an industrialisable method. To do this, the set of conductive tracks forming the security element, with the metal dome, is overmoulded in a plastic material, to form a support for the conductive tracks with openings for the contacts between the conductive tracks and the electronic card on which the security element is implanted. Thus, the manufacture of security elements according to the present technique can be easily industrialisable, therefore reducing the manufacturing costs, while offering a reliability of intrusion detection in an electronic device in which such security elements are implanted.

Also in this manner, these tracks are raised relative to the electronic card, thus avoiding the migration of solder residues.

Finally, the connections between the conductive tracks and the electronic card are not accessible from the outside of the security element, thus greatly enhancing the security of the security element. Indeed, the connections are implemented via tabs extending through lumens provided in the non-conductive assembly in a substantially vertical manner, so as not to protrude from the security element when it is implanted on the electronic card, unlike the known techniques according to which the central track and the outer track are soldered on the card via extensions each protruding from the security element itself.

According to the present technique, the security element is in fact soldered as a component of the "BGA" (for "Ball Grid Array") type, that is to say an integrated box which can be soldered onto the electronic card via a ball grid array under the surface thereof. Herein, the security element is connected to the electronic card via connections under its lower face and not connections protruding from the sides thereof.

According to a particular aspect, the conductive assembly further comprises a track called intermediate track located between the central track and the outer track and having at least one conductive tab intended to connect the intermediate track to the electronic card and the non-conductive support has at least one lumen via which the conductive tab extends from the intermediate track to the electronic card, the end of the conductive tab intended to be in contact with the electronic card not extending beyond the non-conductive assembly such that the connection between the intermediate track and the electronic card is located under the lower face of the non-conductive assembly.

According to this embodiment, the conductive tracks of the conductive assembly of the security element also comprise a track called intermediate track, commonly called a guard ring, which allows detecting an attempt to hack the security element, in order to prevent the detection of an opening of the casing: any attempt to electrically connect the central track (or the central point) and the outer track (or the outer ring) under the dome necessarily causes the contact with the guard ring, and therefore detection of a hacking attempt by the security circuit.

Similarly to the central and outer tracks, this intermediate track has a tab for its connection with the electronic card, this tab extending through a lumen provided in the non-conductive assembly in a substantially vertical manner, so as not to protrude from the security element when it is implanted on the electronic card.

Thus, all connections between the tracks of the conductive assembly and the electronic card are protected from an external access by the non-conductive support.

According to one particular feature, at least one portion of the outer, intermediate and/or central tracks passes through the non-conductive support at the lower face.

According to this embodiment, at least one portion of at least one of the conductive tracks of the conductive assembly of the security element passes through the non-conductive support, so as to emerge at the lower face thereof, in the same way as the tabs provided for the connections with the electronic card. This thus allows providing additional "barriers" in the case of an attempt to access these connections. Thus, for example, the intermediate track allows preventing the access to the solder between the central track and the electronic card, or the outer track allows preventing the access to the solder between the intermediate track and the electronic card.

According to another embodiment, the security element comprises a conductive track called intermediate conductive track, soldered or printed on the electronic card at a predetermined location so as to be located inside the outer track when the security element is electrically connected to the electronic card.

According to this embodiment, the conductive tracks of the security element also comprise a track called intermediate track, commonly called guard ring, which allows detecting an attempt to hack the security element, in order to prevent detecting an opening of the casing: any attempt to electrically connect the central track (or the central point) and the outer track (or the outer ring) under the dome necessarily results in the contact with the guard ring, and therefore a detection of a hacking attempt by the security circuit. This intermediate track is directly soldered, or printed at a predetermined location on the electronic card on which the security element is implanted, so as to act as a guard ring inside the outer track. This embodiment allows ensuring that the intermediate track is located, on the electronic card, at a height different from those of the central track and the outer track of the security element, ensuring a non-contact relative to the metal portion of the security element which, even under heavy strain, will not come into contact with the guard ring.

According to a particular aspect, the conductive assembly is integrated by overmoulding into the non-conductive support to deliver a conductive assembly.

According to this embodiment, the technique of manufacturing the security element is facilitated thanks to the implementation of a support for the conductive tracks, by overmoulding the latter. Such an overmoulding technique is indeed easy to implement and to industrialise.

According to a particular feature, the upper surfaces of the outer track and the central track are raised by a height relative to the upper surface of the intermediate track.

According to this embodiment, the intermediate guard ring is slightly recessed relative to the upper surfaces of the outer ring and the central point, allowing obtaining an enhanced reliability of the security element by ensuring a non-contact relative to the metal portion which, even under heavy strain, will not come into contact with the guard ring.

This configuration also allows minimising the migrations of solder residues between the different tracks of the security element.

According to one particular aspect, the security element further comprises a non-conductive elastically deformable element, denoted actuator, having on the lower face thereof a recess adapted to the shape of the metal portion.

According to this embodiment, the security element comprises a third elastically deformable and non-conductive portion allowing absorbing the manufacturing tolerance deviations thanks to a spring effect, with very little creep. This third portion corresponds to an actuator of the metal portion and is positioned over it. It therefore has, on the lower face thereof, a shape adapted to the shape of the dome. It of course also has a shape adapted to the electronic device in which the electronic card and therefore the security element are implanted.

According to one particular feature, the metal portion is movable between the conductive assembly and the actuator.

Thus, this mobility of the dome within the security element allows limiting the biases due to the mechanical stress undergone by the security element and therefore limiting the deterioration of the dome itself, unlike the known techniques in which the soldered dome is not robust in use. A gluing carried out with a weak adhesive can be considered, in particular to prevent the dome from moving during the process of implantation on the electronic card (for example by reflow) or else during the phases prior to the use of the electronic card or the electronic device in which it is itself implanted (transport for example). This light gluing should not, however, provide a strong hold in order to ensure this mobility of the metal portion allowing the security element to ensure its intrusion/tamper detection function.

For example, the metal portion has a central portion intended to come into contact with the central track of the conductive assembly and a peripheral portion intended to come into contact with the outer track of the conductive assembly.

Thus, according to this embodiment, the dome is "stepped" in order to minimise the efforts that it undergoes.

The present technique also relates to an electronic card comprising at least one security element as previously described, according to its different embodiments.

The present technique also relates to an electronic payment terminal comprising at least one electronic card as previously described, according to its different embodiments.

The present technique also relates to a method for manufacturing at least one security element as previously described, according to its different embodiments. Such a method comprises the following steps:
- forming the conductive assembly into a sheet metal part comprising the outer track connected to the intermediate track which is connected to said central track;
- overmoulding by a non-conductive support of said conductive assembly, delivering a conductive assembly;
- removing the connections between the outer track and the intermediate track and between the intermediate track and the central track by cutting said sheet metal part;
- assembling said metal portion, of the conductive assembly and of a non-conductive elastically deformable element, denoted actuator to deliver the security element.

According to a particular aspect, the method comprises a step of packaging a plurality of security elements on a support.

The present technique also relates to a method for assembling at least one security element as previously described, according to its different embodiments, on an electronic card. Such a method comprises the following steps:
- obtaining said at least one security element on a support obtained by a manufacturing method as previously described, according to its different embodiments;
- positioning said at least one security element by soldering, on the electronic card, the outer track, the intermediate track and the central track via the lumens.

LIST OF FIGURES

Other aims, features and advantages of the invention will appear more clearly on reading the following description, given by way of simple illustrative example, and without limitation, in relation to the figures, from which:

FIG. 1a illustrates an exploded view of several components of a security element, according to one embodiment of the invention;

FIG. 1b illustrates an exploded view of a conductive assembly of a security element, according to one embodiment of the invention;

FIG. 2a illustrates a sectional view of a security element as illustrated in FIG. 1b, according to one embodiment of the invention;

FIG. 2b illustrates an enlargement of a portion of the sectional view of FIG. 2a, according to one embodiment of the invention;

FIG. 3a illustrates a top view of an actuator of a security element, according to one embodiment of the invention;

FIG. 3b illustrates a bottom view of an actuator as illustrated in FIG. 3a, according to one embodiment of the invention;

FIG. 4 illustrates an exploded view of the different components of a security element, according to one embodiment of the invention;

FIG. 5 illustrates a top view of a metal portion of a security element, according to one embodiment of the invention;

FIG. 6 illustrates a sectional view of an assembled security element, according to one embodiment of the invention;

FIG. 7a illustrates the main steps of a method for manufacturing a security element as illustrated in FIG. 6, according to one embodiment of the invention;

FIG. 7b illustrates the result, top view, of the first step of a manufacturing method as illustrated in FIG. 7a, according to one embodiment of the invention;

FIG. 7c illustrates the result, top view, after overmoulding, according to one embodiment of the invention;

FIG. 7d illustrates the result, top view, of the second step of a manufacturing method as illustrated in FIG. 7a, according to one embodiment of the invention;

FIG. 7e illustrates the result, bottom view, of the second step of a manufacturing method as illustrated in FIG. 7a, according to one embodiment of the invention;

FIG. 8a illustrates a bottom view of a conductive assembly of a security element, according to one embodiment of the invention;

FIG. 8b illustrates an example of overmoulding a conductive assembly of a security element, according to one embodiment of the invention;

FIG. 9a illustrates the result, bottom view, of the second step of a manufacturing method as illustrated in FIG. 7a, according to one variant of the embodiment of the invention;

FIG. 9b illustrates the result, bottom view, of the second step of a manufacturing method as illustrated in FIG. 7a, according to one variant of the embodiment of the invention;

FIG. 9c illustrates the result, sectional view, of the second step of a manufacturing method as illustrated in FIG. 7a, according to one variant of the embodiment of the invention;

FIG. 10a illustrates the result, bottom view, of the second step of a manufacturing method as illustrated in FIG. 7a, according to another variant of the embodiment of the invention;

FIG. 10b illustrates the result, sectional view, of the second step of a manufacturing method as illustrated in FIG. 7a, according to another variant of the embodiment of the invention; and FIG. 11 illustrates the main steps of an assembly method of at least one security element on an electronic card, according to one embodiment of the invention.

DETAILED DESCRIPTION OF EMBODIMENTS OF THE INVENTION

As previously indicated, the inventors of the present patent application sought to reinforce the reliability and the robustness of the security elements, or security domes, intended to be implanted on electronic cards, for example in electronic devices such as electronic payment terminals, while limiting the production and implantation costs. To do this, the inventors were confronted with different technical problems, linked to the different methods of installing these security elements on an electronic card.

As already indicated in relation to the prior art, the well-known technique of soldering the security dome directly to an electronic card has the main drawback of a low robustness in use, due in particular to the high strains and movements undergone by the domes soldered on the electronic card. Thus, cracks have been observed on the domes, in use, because the solders stress the domes. Moreover, it was also observed a very low resistance of some domes to the thermal cycles (successions of hot/cold, with a presence of humidity), in particular when two tracks of different potentials are very close. This is in particular due to the fact that solder residues are "trapped" in the enclosure formed by a dome, these residues or impurities generating points of weakness consisting of a conductive accumulation that can lead to the creation of a short circuit.

This problem of robustness is not, or little, observed with domes glued manually on an electronic card. However, the current manual techniques for installing domes by gluing, have the two main drawbacks of low implantation accuracy and low installation efficiency, because such gluing is not reliably reproducible. Some of these techniques also require the use of expensive materials.

The inventors have therefore sought to improve the robustness and reliability of the technique for installing security elements on an electronic card, by preferring the technique for installing by soldering, and by focusing on the manufacture of these security elements.

The principle of the present invention is therefore based on a new and inventive design of a security element, via new elements composing the security element and their particular arrangement, as well as on securing the connections between this security element and the electronic card on which it is implanted.

Thus, the security element is broken down into three main portions, allowing not only ensuring the security function of detecting an intrusion into an electronic device in which it is implanted, but also having a robustness in use and to possible attacks targeted on the security element itself (in order to deactivate the intrusion detection).

The security function of the security element according to the present technique is ensured, in a known manner, by the electrical connection between conductive tracks of a "conductive assembly" intended to be electrically connected to the electronic card of the electronic device to be secured, and a metal portion, called a dome. As already described in relation to the prior art, when the security element is in the operating position (for example implanted on an electronic card, in an electronic payment terminal whose casing is closed), a strain is applied to its metal portion which therefore comes into contact with one or more of the conductive tracks of the conductive assembly, so as to close one or more circuit(s) connected to one or more intrusion detection devices in the electronic payment terminal. Thus, when the casing of the electronic payment terminal is open, the strain applied to the metal portion of the security element is released, opening the circuit and triggering a detection of opening of the casing thanks to the intrusion detection device(s). For example, the microprocessor implementing the intrusion detection checks the conformity of the signal entering the microprocessor relative to the signal output from the microprocessor (for example by comparing voltages). Thus, any opening of the electronic payment terminal, or any connection to the ground of the electronic payment terminal is detected as an intrusion. In addition, these signals can be chained in order to have several detection locations within the electronic payment terminal, such as, for example, at the screen or the lower portion of the casing.

The invention lies in particular in the advantageous arrangement of the conductive tracks of the conductive assembly in a non-conductive support, for example over-moulded on the conductive assembly, allowing obtaining the following technical effects:

optimisation of the manufacture of a security element. Indeed, the integration of the conductive assembly in a support allows an industrialisation of this manufacture and an ease of installation on an electronic card. Thus, unlike the techniques of the prior art, the assembly between the metal portion and the conductive assembly is made easier and reproducible due to the presence of this non-conductive support. This therefore allows optimising the costs of securing the devices in which such security elements are implanted due to the optimisation of the production/manufacturing costs. In addition, as described in more detail below in relation to one embodiment, the security element integrates an actuator, which allows combining the function of the security element and the "actuator" function in the same component and therefore achieving economies of scale and not having to separately install an actuator in the electronic payment terminal;

reliability of the implantation, by soldering, of the security element on the electronic card. Indeed, the raised position of the conductive tracks, integrated in the support, relative to the electronic card allows preventing the "pollution" of these tracks by solder residues, unlike the prior art where the conductive tracks are soldered on the same plane as the electronic card. In addition, in a particularly advantageous manner, the connection between the conductive tracks, and in particular the central track, and the electronic card, is implemented inside the perimeter of the security element, in a substantially vertical manner, via protrusions starting from the tracks and extending to the electronic card, through the non-conductive support. Thus, the connections between the conductive tracks and the electronic card are not accessible from the outside once the security element is implanted on the electronic card.

The invention also lies in the particular arrangement of the conductive tracks of the conductive assembly of the security element, and in particular in the positioning of the track commonly called "guard ring" relative to the other tracks (for example the outer track and the central track).

It should be noted that the conductive tracks forming the conductive assembly of the security element can have various shapes, even if they are often circular in shape. Thus, some particular shapes (squares, diamonds, "peanuts" . . . ) may have the advantage of increasing, for example, the distance between the contact terminations so that they are not opposite to each other, and thus slow down the migrations.

We describe hereinafter circular tracks, by way of illustration, and any other shape is suitable for the implementation of the present technique.

This "guard ring" is provided in particular to prevent hacking the security element itself, for example by a "hacker" who would like to deactivate the security element before opening the casing of an electronic payment terminal. This type of known attack consists for example in injecting conductive ink under the security element, in order to permanently close the security circuit even when the dome is no longer constrained by the closure of the casing of the electronic payment terminal.

However, the guard ring, connected to the electronic card at a potential other than the outer ring, and located according to the present technique inside this outer ring (that is to say between the outer ring and the central point of the conductive assembly) allows detecting such an attack by ink injection. Indeed, such an attack would also result in a connection of the guard ring to the outer ring and to the central point, which can be detected by a change in voltage for example.

Therefore, the present technique is more secure than some known techniques of the prior art, in which the "guard" ring, which is a peripheral ground ring, is outside the dome. This outer configuration of the guard ring is provided in particular for reliability issues, so as to increase its distance from the central point and therefore limit the possibilities of attacks by conductive gluing. This also allows protecting against attacks aiming at "slide" the dome on the electronic card so as to try to access the central point, because in this case, the dome is likely to come into contact with the outer guard ring. However, such a configuration has the drawback of weakening the security, since it remains possible, with a minimum of precautions, to access "under the dome, and therefore to attempt to hack the security element by permanently connecting the dome to conductive tracks even when no strain is applied to the dome.

An embodiment will now be described in more detail, in relation to FIGS. 1a to 11.

FIG. 1a illustrates an exploded view of several components of a security element 1, comprising, as described above, a metal portion 11, or metal dome, and a conductive set 12 in a non-conductive support 13. The conductive set 12 has at least two conductive tracks, intended to be electrically connected to an electronic card, including an outer ring 120 and a central point 122. When the security element is in detection operation, that is to say when it is under strain, the metal portion 11 thereof rests, on the one hand, on the outer ring 120, via the periphery thereof, and on the other hand, on the central point 122 via the centre thereof, thus closing an electrical circuit.

Moreover, these conductive tracks are, according to the present technique, advantageously housed in a non-conductive support (for example a plastic material) having, however, a plurality of lumens, or through holes, in order to allow the electrical connection, by soldering, or conductive gluing (according to the industrial process implemented for the implantation of the security element on the electronic card), of the conductive tracks with the electronic card. For example, two lumens 130 are provided in order to connect the outer ring to the electronic card and two lumens 132 are provided in order to connect the central point to the electronic card. These connections, or links, between the conductive tracks of the security element and the electronic card are possible thanks to protrusions of these conductive tracks, in the form of tabs or "legs", extending substantially vertically from the conductive tracks towards the electronic card, through these lights 130, 132.

Thus, as illustrated in FIG. 1a, the central track 122 has at least one tab 1221 allowing connecting it to the electronic card, for example by soldering. To do this, the tab 1221 corresponds to an extension of the central track 122, folded downwards and terminated by a flat portion intended to be soldered on the electronic card. In order to obtain the desired technical effect of a high level of security of this connection between the central track and the electronic card, the flat end of the tab does not protrude from the perimeter of the security element, and more particularly from the non-conductive support, so as to prevent any attempt to access this connection, once the security element is soldered to the electronic card.

These features apply in the same manner to the connection between the outer track 120 and the electronic card, via at least one tab 1201 corresponding to an extension of the outer track 120, folded downwards and terminated by a flat portion intended to be soldered on the electronic card. The connection between the outer track and the electronic card is therefore not accessible when the security element is soldered on the electronic card.

A more detailed description of the elements allowing this electrical connection is made below.

With such an arrangement of the conductive tracks of the security element 1 in a non-conductive support 13, the inventors have therefore optimised the manufacture of the security element, as will be described below, as well as enhanced the reliability of the security element by optimising its implantation thanks to the raising of the conductive tracks relative to the electronic implantation card. The more significant this raising is, the less likely the elevation of the solder flux to the contact pads, causes of long-term malfunction, is.

Moreover, FIG. 1b illustrates a conductive assembly 14 formed of a non-conductive support 13 and a conductive set 12 having an intermediate track, denoted guard ring 121, located between the central point 122 and the outer ring 120. This guard ring 121 is connected to the electronic card via one or more lumens 131 provided in the non-conductive support 13, as for the other conductive tracks.

Herein again, as for the central and outer tracks, the guard ring 121 has at least one tab 1211 allowing it to be connected to the electronic card, for example by soldering. To do this, the tab 1211 corresponds to an extension of the intermediate track 121, folded downwards and terminated by a flat portion intended to be soldered to the electronic card. The connection between the intermediate track and the electronic card is therefore also not accessible when the security element is soldered to the electronic card.

The advantages and technical effects of this guard ring have already been described above, however, the invention provides an additional advantage to this guard ring, as illustrated in particular in FIGS. 2a and 2b.

Indeed, such a configuration of a guard ring, smaller than the outer ring and located under the metal portion, is known in particular from the patent document U.S. Pat. No. 8,358, 218 issued on Jan. 22, 2013. This document has a security element composed of a metal dome 172, with a central portion 194, a periphery 188 intended to be connected to a set 170 of electrical contacts on a base surface 160. This set 170 comprises a central contact 180 (in connection with 194 when the electronic payment terminal is closed), a central ring 178, an optional intermediate ring 176 (in several portions) and an outer ring 174. All these conductive tracks are implanted on a base surface 160 and the metal portion is soldered thereto via the elements 186. This known configuration has in particular the already mentioned drawbacks:

low robustness to cracking due to the soldering of the metal portion, which is not the case with the present invention;

low tolerance to impurities, and in particular to solder residues, because it is not possible to clean under the dome, because it is "closed" once soldered. Thus, the impurities remain trapped after the reflow process.

An immediate consequence of this solution is a very limited resistance to thermal cycles and humidity, because the solder residues create migrations between the contacts of different potentials, therefore herein between the ground and the central point in particular, or between the ground (the guard ring) and the outer ring.

The present technique does not have these drawbacks thanks to the particular arrangement of the guard ring 121 whose upper surface S1 is slightly recessed, that is to say lower, than the upper surfaces S0 and S2 respectively of the outer ring 120 and of the central point 122. This is very visible in the FIGS. 2a and 2b, the latter illustrating a "zoom" of a portion of FIG. 2a allowing materialising a height h representing this difference between the surfaces S1 and S2 in particular.

Thus, the recessed implantation of the guard ring 121 relative to the central point 122 and to the outer ring 120 allows preventing a contact with the metal portion 11 when a strain is applied thereon, reinforcing again the reliability of the security element as a whole.

In addition, thanks to this difference in height, a solder flux has a lot more distance to cover between the contacts and the migration is much more difficult to do. Indeed, the surface of the conductive tracks is not planar as when all conductive tracks are located directly on the same surface of an electronic card, but has reliefs due to this difference in height h, and thanks to the implementation of the non-conductive support 13 for the central point, the guard ring and the outer ring.

Finally, the particular shape of the central point 122 of the conductive set 12 also allows a lower sensitivity to impurities. Thus, as shown in particular in the FIGS. 1a, 1b, 4, 7b, 7c and 7c, the central point 122, of circular shape, does not have a planar surface but with reliefs, in order to create non-surface contacts.

In addition, in order to avoid the migrations between the pads, an effective measure lies in the removal of the solder terminations, for the contacts of different potentials. Thus, the pads used to solder the outer ring and the pads used to solder the intermediate ring, are not opposite to each other, which increases the distance for the migrations. Likewise, the pads used to solder the central point and the pads used to solder the intermediate ring are not opposite to each other. This configuration allows obtaining, within the same space requirement perimeter (or diameter if the tracks are circular), the distances are increased while increasing the "surface" isolation distances. According to a variant (not illustrated), the guard ring can be directly soldered or printed on the electronic card, at a predetermined location which will allow it to be located inside the outer track of the security element when the latter will be implanted on the electronic card. This variant thus allows obtaining the same technical effect of a difference in height between the surface of the guard ring implanted directly on the electronic card, and those of the outer and central tracks carried by the non-conductive support.

According to another feature of the present technique, and as illustrated in particular in FIGS. 3a and 3b, the security element 1 further comprises an elastically deformable and non-conductive element 15, denoted actuator, intended to cover the other elements of the security element, namely the conductive assembly 14 (comprising the non-conductive support 13 integrating the conductive tracks 120, 121 and 122 of the conductive set 12) and the metal portion 11. To do this, and as illustrated in FIG. 3b, the actuator has in particular, on the lower face thereof, a recess 151 corresponding to and adapted to the shape of the metal portion 11.

For example, this metal portion 11 is presented as illustrated in FIG. 5, that is to say of circular shape with a central portion 112 intended to come into contact with the central point 122 and a peripheral portion 110 intended to come into contact with the outer ring 120. The central portion 112 is for example also circular and shaped in a hollow manner relative to the larger portion of the metal portion 11. The peripheral portion 110 represents a kind of edge whose surface is lower than the largest portion of the metal portion 11.

This specific shape of the metal portion 11 allows in particular limiting the efforts undergone by the security element and therefore reinforcing its robustness in use.

In this case, the shape of the recess of the actuator 15 is adapted to such a specific shape of the metal portion 11.

It should be noted that this shape of the actuator 15, even if it allows obtaining a reduced effort, is not the only solution. A reduction of the thickness of the dome in particular, even with a shape closer to a sphere portion, also allows obtaining a lower effort.

Moreover, the actuator 15 also has a cylindrical protrusion 150 on the upper face thereof, which allows in particular a better grip. Indeed, once implanted on the electronic card itself integrated in an electronic payment terminal, for example, the actuator is "stuck" under the cover of the electronic payment terminal, the opening of which is sought to be detected. The combination of the dome spring forces and the actuator friction in the cover can detect an intrusion when opening the cover. Advantageously, this actuator 15 is made of silicone, for example, in order to have an adequate spring effect, with very little creep, and to absorb manufacturing tolerance deviations. This actuator 15 also allows controlling the efforts undergone by the dome in operation and avoiding "false" intrusion detections, in particular for example in the case of fall of the electronic payment terminal which could lead to an opening of the security circuit or a reversal of the dome and thus trigger the detection of an intrusion . . . Finally, the actuator 15 also has a role of protecting the other components of the security element.

The different elements composing the security element 1 are illustrated in FIG. 4, in an exploded view representing them superimposed, as well as in FIG. 6, in a sectional view representing them assembled in the released position, the conductive tracks 120, 121 and 122 being soldered to the electronic card 20.

It is clear in the light of the above explanations and these Figures that the metal portion 11 is completely free and movable between the conductive assembly 14 (non-conductive support 13 integrating the conductive tracks of the conductive set 12) and the actuator 15. This constitutes advantages and technical effects relative to the solutions of the prior art in which in particular the dome is glued or soldered directly on the electronic card.

Indeed, the techniques of the prior art providing for a soldered dome, have the major drawback of stiffening the dome itself. This means that a significant mechanical action on the dome allows crushing it without breaking the contact, and that once the dome is deformed, by crushing, an attempt to open the electronic device is not detected. In addition, these solutions also pose problems of reliability over time because the brazing and the dome are continuously biased by the mechanical stress of the dome.

Moreover, this mobility of the metal portion 11, combined with the implementation of the non-conductive support 13 for the conductive tracks 120, 121 and 122, allows an accurate and easy implantation on an electronic card, making possible an efficient reproducibility and with high efficiency of the implementation of such security elements, unlike the known techniques requiring an accurate soldering of the dome itself.

Finally, the mobility of the metal portion 11 allows making the security element less vulnerable to the attacks from a "hacker" who would seek to solder a spy element thereon, because he would take the risk that the contact is broken between the dome and the conductive tracks, and therefore would trigger the intrusion detection.

It should be noted that the metal portion of the security element can be glued with a weak adhesive, so as to ensure its hold during the phases prior to its use, once the electronic card with the security element is implanted in an electronic device to be secured, such as an electronic payment terminal.

Thus, during the reflow process allowing implanting the components on the electronic card, then the manufacturing method of the electronic payment terminal, as well as its transport, the dome does not move enough to be badly positioned and therefore unusable, but remains sufficiently movable to play its role as an intrusion detector when the electronic payment terminal is in operation.

The proposed solution therefore allows overcoming these drawbacks of the techniques of the prior art and reducing the vulnerability of the security elements to "gluing" attempts intended to "deactivate" them.

In addition, the high industrialisation of such a security element also allows integrating it into an installation method such as the "pick and place" (gripping and positioning) allowing soldering it to a very accurate position on an electronic card (or the gluing by conductive glue, at the terminations, then a polymerisation by temperature). The technical effect obtained is therefore the reproducibility of the extremely accurate soldering (relative to a glued dome) and the mechanical strength much better than a simple glue. This accuracy of implantation allows reinforcing the reliability of the security of the electronic device itself, which is essential in particular for an application in electronic payment terminals. Indeed, a positioning inaccuracy can cause an approximation of the dome and the guard or outer rings, and therefore, because of this reduced isolation distance, reduce the weather resistance of the safety element, and potentially create unwanted malfunctions.

In addition, the positioning of the guard ring inside the outer ring of the set of conductive tracks reinforces the security aspect, making it impossible to glue the dome with a conductive ink, especially since the conductive tracks are not soldered directly on the electronic card, but are integrated into a non-conductive support so as to raise them relative to the surface of the electronic card. This implementation of the support has indeed the advantage of preventing the pollution of the surface between the conductive tracks by solder residues.

Finally, the freedom of movement of the metal dome in the security element makes any attempt to attack against this security element itself more complicated: the dome itself not being glued (or possibly glued by a weak adhesive, to hold during the reflow process, as described above), it holds only thanks to the pressure exerted thereon by the actuator. Attempting to attack this dome requires, for example, gluing it from the outside before opening the electronic device, which extends the duration of the intrusion and is therefore unfavourable following the attack, the duration of the attack being considered as an essential criterion according to the PCI DSS standard (for "Payment Card Industry Data Security Standard"). Likewise, the freedom of movement of the dome in the security element combined with the presence of an intermediate guard ring allows guarding against an attack which would consist in returning the dome by a "punch stroke", making the durable contact between the dome and the central point of the conductive assembly, even in the absence of strain on the dome.

In relation to FIGS. 7a to 7e, the main steps of a method for manufacturing a security element are shown as described above, according to the different embodiments.

According to this embodiment, the method comprises in particular a step E1 of forming the conductive assembly delivering a sheet metal part comprising the different conductive tracks, including the outer ring connected to the intermediate ring which is connected to the central point.

This sheet metal part is for example illustrated in FIG. 7b. At the end of this step E1, the conductive tracks are therefore connected to each other by connecting elements 70, which will be partially cut during the subsequent removal step E2 described below.

As already described above, the conductive set 12 of conductive tracks is not soldered directly on the electronic card, when the security element is implanted thereon, but is first integrated into a non-conductive support 13, which has openings/lumens 130, 131, 132 allowing the soldering, at certain points, of each of the conductive tracks on the electronic card. According to this embodiment, the soldering points, that is to say the tabs 1201, 1211 and 1221, moreover advantageously coincide with the remaining portions of the temporary connections 70 between the tracks obtained at the end of the step E1, as illustrated in FIG. 7e described below.

In a variant, illustrated in FIGS. 9a to 9c and described below, the openings provided in the non-conductive support for cutting the connecting elements 70 do not correspond to the lumens 131 and 132 allowing the passage of the tabs 1211 and 1221.

Obtaining this non-conductive support 13 is implemented, according to this embodiment, by overmoulding the conductive set 12 in a plastic material, delivering a conductive assembly as illustrated for example in FIG. 7c. Other methods of obtaining this conductive assembly are of course possible.

At the end of this overmoulding, a step E2 of removing/cutting the connections between the different conductive tracks is implemented, by cutting the sheet metal part, to deliver the conductive assembly 14 itself, as illustrated for example in FIG. 7d. At the end of this step E2, the connections 70 therefore no longer exist and the different conductive tracks are no longer connected to each other. It can thus be seen in FIG. 7d that the lumens 130, 131 and 132 allow the soldering, at certain points, of the tracks 120, 121 and 122 on the electronic card, thanks to sheet metal elements provided for this purpose. These elements are shaped as tabs 1201, 1211 and 1221 extending, at certain points of the different conductive tracks, in a direction substantially orthogonal to these tracks, downwards and therefore towards the electronic card when the security element is installed thereon.

In FIG. 7e, the dotted rectangles illustrate the cutting areas merging with the slots provided to pass the connecting tabs between the conductive tracks and the electronic card, as described above. It should also be noted that according to this embodiment, and as illustrated in FIGS. 8a and 8b, illustrating bottom views of the conductive assembly 14, the conductive tracks themselves partially pass through the non-conductive support 13, so as to reinforce the security of the security element when it is implanted on an electronic card. Indeed, a portion of the guard ring 121 is thus used as an additional barrier to prevent an access to the connections of the central track 122 and a portion of the outer track 120 is also used, for its part, as a barrier to prevent an access to the connections of the guard ring 121.

The conductive tracks are however not entirely flush under the surface of the non-conductive support 13, so as to allow the overmoulding of the conductive set 12 in a plastic material while allowing the plastic material to pass from one area to another, as illustrated in FIG. 8b by the arrows representing the flow of material, from the injection point P1.

As indicated above, a variant provides that the cutting areas of the connecting elements 70 provided in the non-conductive support do not correspond to the lumens 131 and 132 allowing the passage of the tabs 1211 and 1221. This variant is illustrated in particular, in bottom views, in FIGS. 9a to 9c. In FIGS. 9a and 9b, the dotted rectangles illustrate the lumens provided to pass the connecting tabs between the conductive tracks and the electronic card, while the cutting areas Zc are quite distinct.

FIG. 9c for its part allows illustrating that the ends of the tabs 1201 and 1221 provided to be soldered on the electronic card are well under the surface of the non-conductive support, and not at one of these cutting areas Zc.

Finally, according to yet another variant, associated with the previous one in FIGS. 10a and 10b, the conductive tracks are not through-tracks of the non-conductive support, the conductive tabs alone 1211 and 1221 being through-tabs to ensure the connection between the conductive tracks and the electronic card.

Thus, in FIG. 10a, illustrating a conductive assembly 14 seen from above, it can be seen that the cutting areas Zc do not correspond to the places where the tabs 1211 and 1221 come out under the surface of the non-conductive support 13. Likewise, in the sectional view of the FIG. 10b, it is observed that the tabs 1221 protrude under the surface of the non-conductive support 13, but not the conductive tracks 120, 121 and 122.

In this case, the protection against the lateral access to the conductive tabs can be achieved by means other than protruding from the conductive tracks. For example, it is possible to add a conductive track printed on the electronic card, with a different potential from the track of the conductive set and making the passage of a metal rod by a fraudster more complex.

The method for manufacturing the security element further comprises a step E3 of assembling the metal part 11, which is movable between the conductive assembly 14 and a non-conductive elastically deformable element, denoted actuator 15 and already described above.

As already indicated, the present technique allows an industrialisation method. To do this, the manufacturing method also comprises a step E4 (not illustrated) of packaging a plurality of security elements as obtained at the end of step E3, on a support, for example a strip. This strip layout indeed allows the successive automatic uptake of a plurality of security elements (for example via a machine equipped with a suction cup, suction or clamp system for each security element) to position them and solder them at each of the locations provided on an electronic card.

Such an implementation is carried out for example according to a method for assembling at least one security element on an electronic card as illustrated for example in FIG. 11. According to this embodiment, a step E5 of obtaining at least one security element on a support obtained by the manufacturing method described above is implemented then a step E6 of positioning this security element by soldering, on the electronic card, of the outer ring, the intermediate ring and the central point of the conductive assembly at certain points, via the lumens provided for this purpose in the non-conductive support.

Thus, the proposed technical solution allows improving the assembly of the security domes on the electronic cards and consequently the quality of manufacture of the electronic payment terminals comprising such cards, thanks to a reproducible positioning on the card obtained by the automation of the method. In addition, the automation of this method also allows obtaining productivity gains. This technical solution is therefore easily transposable to a set of electronic payment terminals comprising electronic cards assembled in this manner, and easily industrialisable.

The proposed technical assembly solution therefore also increases the manufacturing quality of the payment terminals while improving security.

The invention claimed is:

1. A security element configured to be electrically connected to an electronic card, said security element comprising:
   a metal portion, called a dome;
   a conductive set comprising a plurality of conductive tracks which are not connected to each other and comprising at least one track called an outer track and at least one track called a central track, said outer and central tracks each having at least one conductive tab to connect respectively said outer and central tracks to said electronic card;
   a non-conductive support for said plurality of conductive tracks of said conductive set having lumens via which said conductive tabs extend from said outer and central tracks to said electronic card;
   wherein an end of each of said conductive tabs is configured to be in contact with said electronic card and does not extend beyond said non-conductive support such that connections between said outer and central tracks and said electronic card are located under a lower face of said non-conductive support.

2. The security element according to claim 1, wherein said conductive set further comprises a track called an intermediate track located between said central track and said outer track and having at least one conductive tab to connect said intermediate track to said electronic card and wherein said non-conductive support has at least one lumen via which said at least one conductive tab extends from said intermediate track to said electronic card, an end of said conductive tab of the intermediate track being configured to be in contact with said electronic card and not extending beyond said non-conductive support such that the connection between said intermediate track and said electronic card is located under said lower face of said non-conductive support.

3. The security element according to claim 2, wherein at least one portion of said outer, intermediate and/or central tracks passes through said non-conductive support at said lower face.

4. The security element according to claim 1, which further comprises a conductive track called an intermediate conductive track, soldered or printed on said electronic card at a predetermined location so as to be located inside said outer track when said security element is electrically connected to said electronic card.

5. The security element according to claim 1, wherein said conductive set is overmoulded into said non-conductive support, forming an assembly.

6. The security element according to claim 2, wherein upper surfaces of said outer track and of said central track are raised by a height relative to an upper surface of said intermediate track.

7. The security element according to claim 1, which further comprises a non-conductive elastically deformable element, denoted an actuator, having on a lower face thereof a recess adapted to a shape of said metal portion.

8. The security element according to claim 7, wherein said metal portion is movable between said conductive set and said actuator.

9. The security element according to claim 1, wherein said metal portion has a central portion to come into contact with said central track of said conductive set and a peripheral portion to come into contact with said outer track of said conductive set.

10. An electronic card comprising the security element according to claim 1.

11. An electronic payment terminal comprising the electronic card according to claim 10.

12. A method comprising:
manufacturing at least one security element comprising:
a metal portion, called a dome;
a conductive set comprising a plurality of conductive tracks which are not connected to each other and comprising at least one track called an outer track and at least one track called a central track, said outer and central tracks each having at least one conductive tab to connect respectively said outer and central tracks to an electronic card;
a non-conductive support for said plurality of conductive tracks of said conductive set having lumens via which said conductive tabs extend from said outer and central tracks to said electronic card;
wherein an end of each of said conductive tabs is configured to be in contact with said electronic card and does not extend beyond said non-conductive support such that connections between said outer and central tracks and said electronic card are located under a lower face of said non-conductive support,
wherein the manufacturing comprises:
forming said conductive set into a sheet metal part comprising said outer track connected to said intermediate track which is connected to said central track;
overmoulding by a non-conductive support of said conductive set;
removing the connections between said outer track and said intermediate track and between said intermediate track and said central track by cutting said sheet metal part; and
assembling said metal portion, of said conductive set and of a non-conductive elastically deformable element, denoted an actuator to deliver said security element.

13. The method according to claim 12, wherein the method comprises packaging a plurality of security elements on a support.

14. The method according to claim 12, wherein the method comprises:
positioning said at least one security element by soldering, on said electronic card, said outer track, said intermediate track and said central track via said lumens.

15. The security element according to claim 5, wherein upper surfaces of said outer track and of said central track are raised by a height relative to an upper surface of said intermediate track.

* * * * *